US012627732B2

(12) United States Patent (10) Patent No.: US 12,627,732 B2

Murstein et al. (45) **Date of Patent: *May 12, 2026**

(54) HOSTED FILE SYNC WITH STATELESS SYNC NODES

(71) Applicant: Microsoft Technology Licensing, LLC, Redmond, WA (US)

(72) Inventors: Michael Murstein, Bellevue, WA (US); Cristian Teodorescu, Seattle, WA (US); Jason Shay, Seattle, WA (US); James Benton, Hanover, NH (US); Ivelin Zheglov, Duval, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,943

(22) Filed: Feb. 2, 2024

(65) Prior Publication Data

US 2024/0179212 A1 May 30, 2024

Related U.S. Application Data

(63) Continuation of application No. 16/558,978, filed on Sep. 3, 2019, now Pat. No. 11,943,291, which is a (Continued)

(51) Int. Cl.
*H04L 67/1095* (2022.01)
*G06F 16/178* (2019.01)
(Continued)

(52) U.S. Cl.
CPC ........ *H04L 67/1095* (2013.01); *G06F 16/178* (2019.01); *G06F 16/183* (2019.01);
(Continued)

(58) Field of Classification Search
CPC .......................... H04L 67/1095; G06F 16/278
(Continued)

(56) References Cited

U.S. PATENT DOCUMENTS

2004/0199669 A1 10/2004 Riggs
2004/0243709 A1* 12/2004 Kalyanavarathan ........................
H04L 67/1001
709/226

(Continued)

FOREIGN PATENT DOCUMENTS

CN 103369029 A 10/2013
CN 104219283 A 12/2014
KR 20140061109 A 5/2014

OTHER PUBLICATIONS

First Office Action Received for Chinese Application No. 202210320277.7, mailed on Oct. 26, 2024, 11 pages (English Translation Provided).

(Continued)

*Primary Examiner* — Sibte H Bukhari

(57) ABSTRACT

Disclosed herein is a system and method to synchronize files from a hosted file system where the client endpoint devices have direct access to the files stored on a hosted file store. When the client desires to synchronize with the files stored on the hosted file store the process identifies a sync role that can process the request. The particular sync role does not need to maintain state with the client device or the file store. The state necessary for the processing of the synchronization process is maintained separate from the sync role such that any sync role in the system can pick up the requests and process the requests. Once the role has been selected the synchronization process proceeds as normal. As state is not maintained by the sync role multiple roles can process the request or two roles can handle different portions of the process.

20 Claims, 4 Drawing Sheets

Related U.S. Application Data continuation of application No. 14/922,179, filed on Oct. 25, 2015, now Pat. No. 10,440,106.

(60) Provisional application No. 62/218,430, filed on Sep. 14, 2015.

(51) Int. Cl.

| | |
|---|---|
| *G06F 16/18* | (2019.01) |
| *G06F 16/182* | (2019.01) |
| *G06F 16/23* | (2019.01) |
| *G06F 16/25* | (2019.01) |
| *G06F 16/27* | (2019.01) |

(52) U.S. Cl.
CPC ........ *G06F 16/1873* (2019.01); *G06F 16/235* (2019.01); *G06F 16/2379* (2019.01); *G06F 16/252* (2019.01); *G06F 16/27* (2019.01); *G06F 16/278* (2019.01)

(58) Field of Classification Search
USPC ......................................................... 709/219
See application file for complete search history.

(56) References Cited

U.S. PATENT DOCUMENTS

| | | | | |
|---|---|---|---|---|
| 2009/0122813 | A1* | 5/2009 | Zhang | H04J 3/065 |
| | | | | 370/503 |
| 2009/0249222 | A1* | 10/2009 | Schmidt | H04N 21/4143 |
| | | | | 713/400 |
| 2012/0176941 | A1* | 7/2012 | Bata | H04W 84/18 |
| | | | | 370/255 |
| 2014/0181051 | A1 | 6/2014 | Montulli et al. | |
| 2016/0210020 | A1 | 7/2016 | Lacas et al. | |

OTHER PUBLICATIONS

Communication under rule 71(3) EPC received for EP Application No. 16775359.9, mailed on May 14, 2019, 7 pages.

Decision to Grant a European Patent Pursuant to Artice 97(1) EPC received for EP Application No. 16775359.9, mailed on Sep. 26, 2019, 1 page.

Notice of Allowance Received for Chinese Application No. 202210320277.7, mailed on Mar. 10, 2025, 04 pages (English Translation Provided).

* cited by examiner

HOSTED FILE SYNC WITH STATELESS SYNC NODES

CROSS-REFERENCE TO RELATED APPLICATION(S)

The present application is a continuation of U.S. patent application Ser. No. 16/558,978, filed on Sep. 3, 2019, which is a continuation of U.S. patent application Ser. No. 14/922, 179, filed on Oct. 25, 2015, now U.S. Pat. No. 10,440,106, which claims the benefit of U.S. Provisional Patent Application No. 62/218,430, filed on Sep. 14, 2015, all of which are hereby incorporated by reference in their entireties.

BACKGROUND

Various file sync solutions have been generated through the years. In these solutions the sync end-points are accessible to users and applications. When files are being created, modified or deleted, an active-active sync engine is responsible for syncing these changes and bringing all end-points to a consistent state. Some sync solutions support having a hosted file endpoint. However, these solutions suffer from one or both of the following limitations. First the hosted end-point is not accessible to end-users or applications. Instead, the hosted end-point serves only as a 'hub' to sync files between other (non-cloud) end points. Second the hosted end point may be accessible, but is accessible only via a sync solution specific access protocol. In essence, there is no 'direct access' to files at the hosted end point. Instead, the application or service must implement the sync solution specific protocol and access the files through the sync solution as an intermediate layer. Further, a sync session requires that some state is persisted throughout the session. This requires that state is maintained between the servicing node and both endpoints such that in a scalable system the process is tied to a specific node.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present disclosure presents a system and method that can be used to synchronize files from a hosted file system where the client endpoint devices have direct access to the files stored on a hosted file store/system. When the client desires to synchronize with the files stored on the hosted file store the process identifies a sync role on a hosted platform that can process the request. The particular sync role does not need to maintain state or the file store. The state necessary for the processing of the synchronization process is maintained separate from the sync role such that any sync role in the system can pick up the requests and process the requests. Once the role has been selected the synchronization process proceeds as normal. As state is not maintained by the sync role multiple roles can process the request or two roles can handle different portions of the synchronization process. This permits the core service to scale out or down the size of the sync roles based on need as well as to manage the use of resources efficiently.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
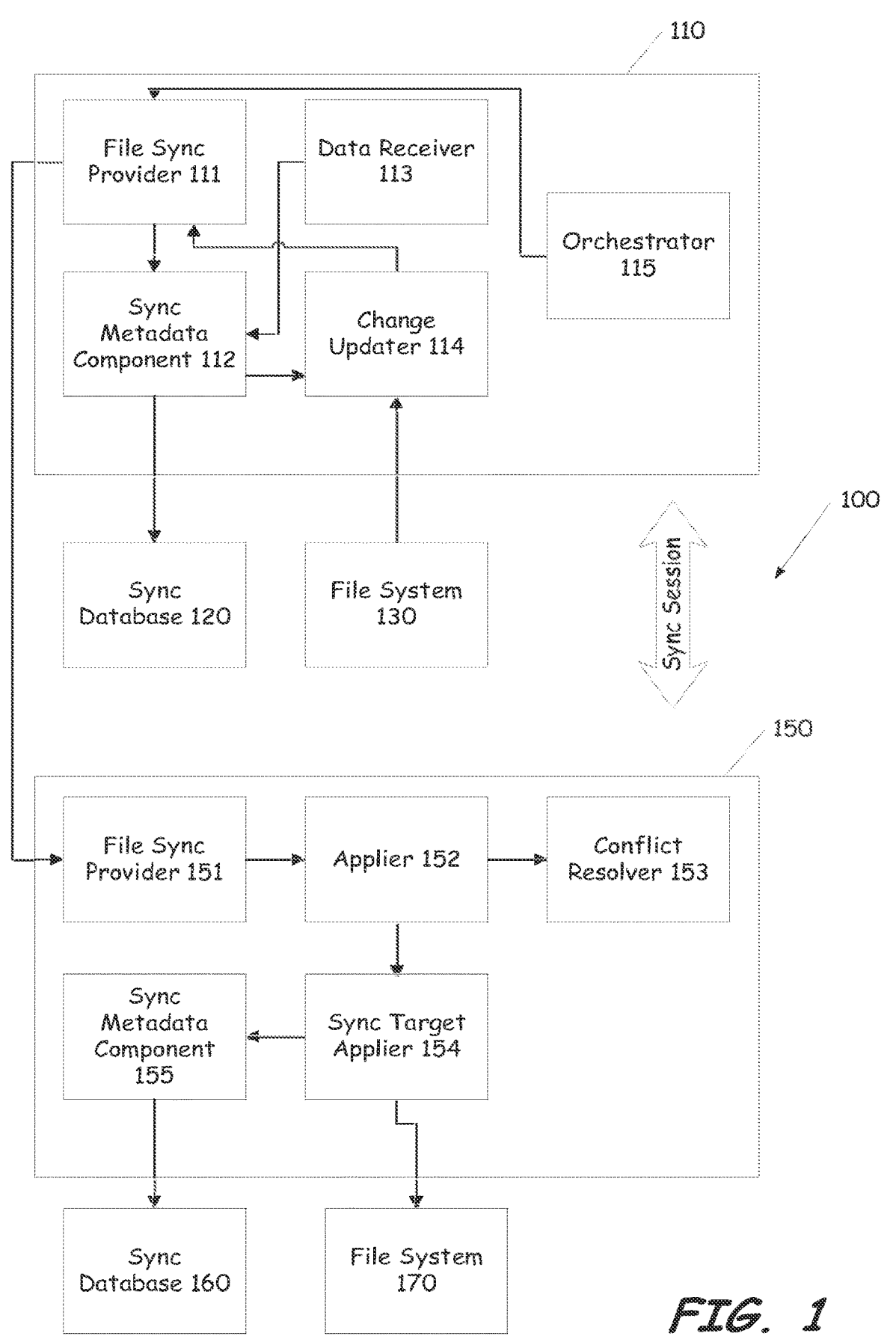
FIG. 1 is a high level block diagram illustrating components of a file synchronization system according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media, but not within computer storage media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a high level block diagram illustrating components of a file synchronization system 100. The file synchronization system 100 includes a sync endpoint 110 and a sync endpoint 150. The sync endpoint 110 is connected with a sync database 120 and is associated with a file system 130. Likewise the sync endpoint 150 is connected with a sync database 160 and is associated with a file system 170. The sync endpoint 110 includes a file sync provider 111, a sync metadata component 112, a data receiver 113, a change updater 114 and an orchestrator 115. Sync endpoint 150 includes a file sync provider 151, an applier component 152, a conflict resolver/detector 153, a sync applier target 154, and a sync metadata component 155. For purposes of this discussion the components are arranged in an upload scenario from endpoint 110 to endpoint 150.

Before discussing the specific components of a file sync provider 111 or 151, the different types of participants that can provide data will be discussed. A participant is a location where information from a data source is retrieved. A participant could be anything from a web service, to a laptop, to a USB thumb drive.

Based on the capabilities of the particular device, the way that a provider integrates synchronization will vary. At the very least, the device is capable of programmatically returning information when requested. Ultimately, what needs to be determined is if the device can enable information to be stored and manipulated either on the existing device or within the current data store, and allow applications to be executed directly from the device.

It is important to distinguish the types of participants to know if the participant will be able to store any state information required by the provider, and if it is possible to execute the provider directly from the device. Ideally, the participant model is generic. As such, a full participant could be configured to be either a partial or simple participant.

Full participants are devices that allow developers to create applications and new data stores directly on the device. A laptop or a Smartphone are examples of full participants because new applications can be executed directly from the device and new data stores can be created to persist information if required. Partial participants are devices that have the ability to store data either in the existing data store or another data store on the device. These devices, however, do not have the ability to launch executables directly from the device. Some examples of these participants are thumb drives or SD Cards. These devices act like a hard drive where information can be created, updated or deleted. However, they do not typically give an interface that allows applications to be executed on them directly. Simple participants are devices that are only capable of providing information when requested. These devices cannot store or manipulate new data and are unable to support the creation of new applications. RSS Feeds and web services provided by an external organization such as Amazon or EBay are both examples of simple participants. These organizations may give the ability to execute or call web services and get results back, however, they do not give the ability to create data stores for a particular user, and they also do not give the ability to create applications to be executed within their web servers.

The file sync provider 111 and provider 151 are similar components found both on the sync endpoint 110 and the sync endpoint 150. The file sync provider can be used to synchronize files and folders in many different file systems such as NTFS, FAT, or SMB file systems. Further, the directories to synchronize can be local or remote. They do not have to be of the same file system. An application can use static filters to exclude or include files either by listing them explicitly or by using wildcard characters (such as *.txt). Or the application can set filters that exclude whole subfolders. An application can also register to receive notification of file synchronization progress.

The orchestrator 115 is a component of the system 100 that is configured to initiate and control a sync session between two endpoints or participants. The orchestrator communicates with both providers 111 and 151 to start the synchronization process and reports back to the progress of the synchronization. The actual processes used by the orchestrator are well known in the synchronization process and any process can be used by the orchestrator 115.

The change updater 114 is a component of the system 100 that identifies local changes to the file system that did not occur through the sync since the last time the change updater 114 ran. The detection/identification of a change can be made by simply comparing the timestamps associated with a corresponding last sync time. Other approaches and methods can be used for determining changes that have been made in a namespace.

The sync databases 120 and 160 are a component of the system 100 that stores metadata about the files in the file system. The sync databases 120 and 160 provide metadata about particular files that are to be synced between the client and the server. These databases may also be referred to as a metadata store.

The sync database 120, 160 provides the ability to store information about the file system and the objects within that file system with respect to state and change information. The metadata for a file system can be broken down into five components (concurrency tracking properties): versions, knowledge, tick count, replica ID and tombstones.

For each item that is being synchronized, a small amount of information is stored that describes where and when the item was changed. This metadata is composed of two versions: a creation version and an update version. A version is composed of two components: a tick count assigned by the data store and the replica ID for the data store. As items are updated, the tick count is incremented by the data store and the new current tick count is applied to that item. The replica ID is a unique value that identifies a particular data store. The creation version is the same as the update version when the item is created. Subsequent updates to the item modify the update version. That is the creation version remains constant while the update version changes.

There are two primary ways that versioning can be implemented. The first is referred to as in line tracking. In this method change tracking information for an item is updated as the change is made. In the case of a database, for example, a trigger may be used to update a change tracking table immediately after a row is updated. The second method is referred to as asynchronous tracking. In this method, there is an external process that runs and scans for changes. Any updates found are added to the version information. This process may be part of a scheduled process or it may be executed prior to synchronization. This process is typically used when there are no internal mechanisms to automatically update version information when items are updated (for example, when there is no way to inject logic in the update pipeline). A common way to check for changes is to store the state of an item and compare that it to its current state. For example, it might check to see if the last-write-time or file size had changed since the last update. Of course other methods for versioning can be used as well.

All change-tracking must occur at least at the level of items. In other words, every item must have an independent version. In the case of file synchronization an item will likely be the file, but it may be other items which can be synchronized, such as a directory. More granular tracking may be desirable in some scenarios as it reduces the potential for data conflicts (two users updating the same item on different replicas). The downside is that it increases the amount of change-tracking information stored.

Another concept is the notion of knowledge. Knowledge is a compact representation of changes that the replica is aware of. As version information is updated so does the knowledge for the data store. Providers such as providers 111 and 151 use replica knowledge to enumerate changes (determine which changes another replica is not aware of), and to detect conflicts (determine which operations were made without knowledge of each other).

Each replica should also maintain tombstone information for each of the items that are deleted. This is important because when synchronization is executed, if the item is no longer there, the provider will have no way of telling that this item has been deleted and therefore cannot propagate the change to other providers. A tombstone can contain the following information a global ID, a update version and a creation version. Because the number of tombstones will grow over time, some implementations may create a process to clean up this store after a period of time in order to save space. That is these deleted files are removed from the list of files that are maintained with metadata information. In order to prevent this from happening the system can implement a method for catching these files. The method starts out by first identifying if the condition has been met, where there is a possibility of a lost tombstone. The replicas maintain another copy of knowledge, which can be considered or referred to as 'Forgotten Knowledge'. When tombstones are removed/cleaned up from a database, the forgotten knowledge is set/updated. This forgotten knowledge may keep track of what tick counts have been cleaned up through. This can provide a hint as to when tombstones may have been lost. Then, if sync does not happen for a while (a replica becomes stale), the forgotten knowledge helps detect that a replica may be stale. Stale replicas can then initiate a 'full enumeration sync session'. This full enumeration is a time intensive and expensive sync session whereby all files metadata is transferred between the participants of the sync session.

The applier 152 is a component of the system that applies the specific changes that are indicated as being needed to complete the sync process. These changes are the changes that were noted by the change updater 114 in the sync process based on the metadata that is associated with each of the files. Depending on the direction of the sync process (upload or download) the applier 152 will operate on the corresponding sync endpoint. In FIG. 1 the illustration is of the uploading process where client 110 is uploading its changes to the client 150.

Conflict resolver 153 resolves detected conflicts between a data file that has already been stored and a purported updated version of the data file that is received as part of the syncing process. Fundamentally, a conflict occurs if a change is made to the same item on two replicas between synchronization sessions. Conflicts specifically occur when the source knowledge does not contain the destination version for an item (it is understood that the destination knowledge does not contain any of the source versions sent). If the version is contained in the destination's knowledge then the change is considered obsolete. Replicas are free to implement a variety of policies for the resolution of items in conflict across the synchronization community. In some approaches each of the replicas makes the same resolution regardless of where the conflict occurred or where it was detected.

The following are some examples of commonly used resolution policies: Source Wins: Changes made by the local replica always win in the event of a conflict. Destination wins, the remote replica always wins. Specified replica ID always wins, that is no matter who changes an item, the replica with the designated ID always wins. Last-writer wins, this is based on the assumption that all replicas are trusted to make changes, and that wall clocks are synchronized. Therefore the last writer to the file is allowed to win. Merge, in the event of two duplicate items in conflict, the system merges the information from one file into the other. Log conflict, in this approach the system chooses to simply log or defer the conflict.

The sync target applier 154 is a component of the system that applies the indicated changes following the resolution of any conflicts as determined by the conflict resolver. The specific changes are split into two groups. The first group is the actual data that was changed to the file. This information is processed through the applier 154 and provided to the file system 170 which causes the appropriate change to be made to the underlying file. The second set of changes are those changes that are made to the sync metadata. These are applied to the sync database 160 through the metadata component 155 where the metadata about the particular files are stored.

Hosted platforms often implement many instances of a particular service or scale units. Each of the instances of the service may be associated with a particular client or a particular subscription to the service. Traditional hosted platforms can in response to increased loads add additional resources to the instances. However, the additional resources cause an increase in all of the resources that make up the service and not the individual components that make of the service. That is all components of the service are increased as opposed to only the individual components that need more resources. Services represent independent units of lifecycle and management in the platform, and can be deployed and serviced in complete isolation from other services. Communication between services is possible only via public endpoints, whereas communication between roles of services can be done over public, and internal/protected endpoints. From networking point of view each service has single load balanced virtual IP (VIP). Each VIP is a separate entity for detecting and protecting against distributed denial of services (DDOS) attacks. In order to avoid requiring non-default HTTP ports (80, 443) remapping by the customers for communicating to different roles endpoints within a single service one approach utilizes separate services exposing endpoints on the default ports. A second approach utilizes a frontdoor service routing requests on the default ports to the roles within a single service based on a received uniform resource locator (URL). Services and roles in the present platform both include logically related groups of components. Separate services are created when their functions or deployment are significantly decoupled from one another, or when functionality of dependent services is leveraged.

Figure 2:
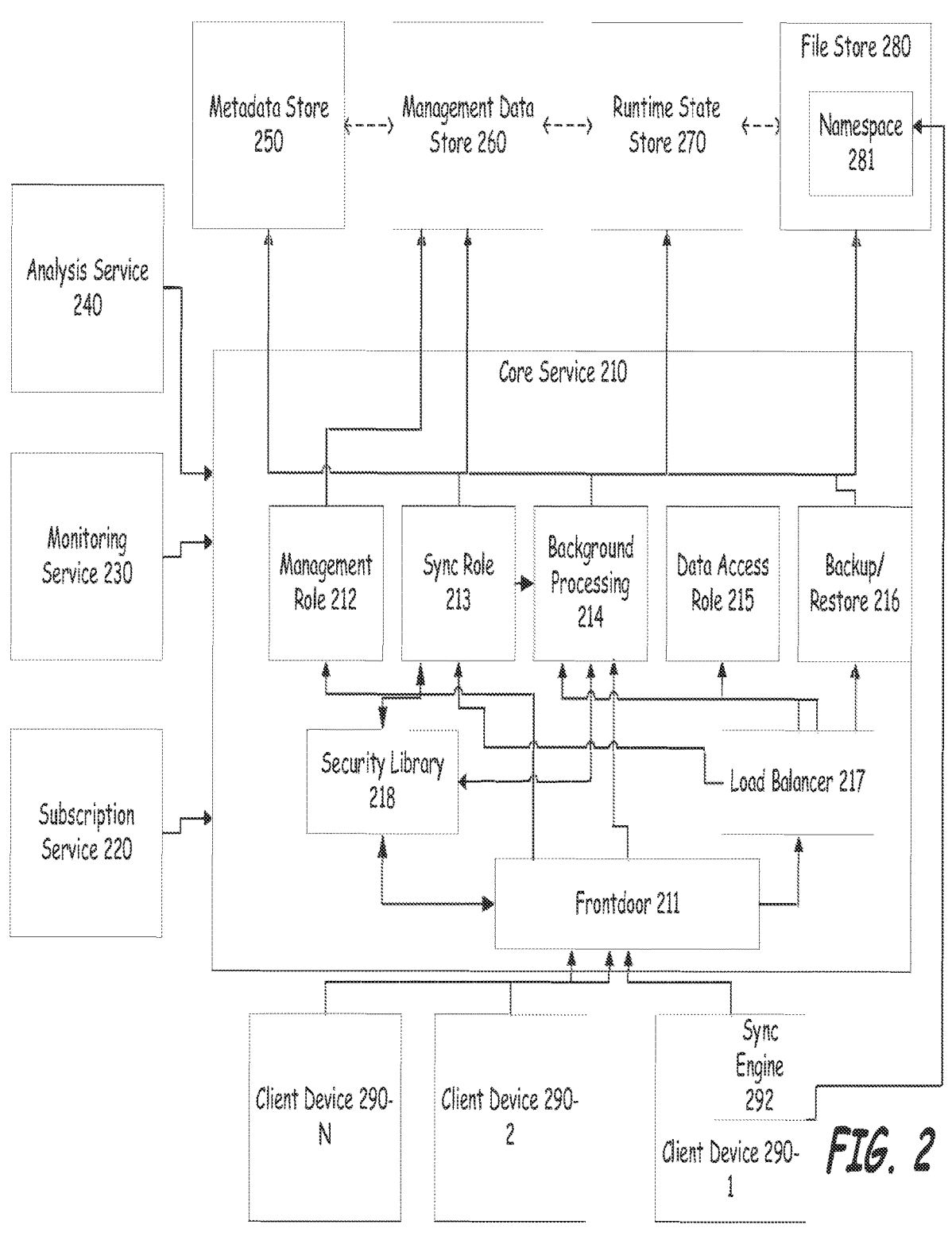
FIG. 2 is block diagram of a file synchronization system where the client devices have direct access to a hosted file store according to one illustrative embodiment.

FIG. 2 is a block diagram of a platform 200 implementing services and roles according to one approach. The services include a subscription service 220, a core service 210, a monitoring service 230, analytics service 240, a metadata store 250, a management data store 260, a file store 280 and runtime state store 270. However, in other approaches additional services can be added to the platform depending on the needs and desires of the particular end user. Client devices 290 connect to the platform to access these services.

The core service 210 implements a number of different roles within the service. These roles include a frontdoor role 211, a management role 212, a sync/recall role 213, a background processing role 214, a data access discovery role 215, and a backup/restore role 216. It should be noted that FIG. 2 illustrates a single instance of the core service 210 and each role within the core service 210. However, in the present platform the core service 210 can exist on any number of nodes and these nodes can be distributed at different locations around the globe or within a data center. A request for any particular role can be serviced by anyone of these particular instances of the node. Further, none of the roles presented herein is tied to a particular instance of a file store 280 or metadata table. Even further, it should be noted that depending on needs of the platform certain roles can be expanded to be on more nodes without the need to scale out the remaining roles as well.

The frontdoor role 211 is in one approach configured to implement a thin frontdoor based on a gatekeeper pattern. A gatekeeper pattern is designed to protect applications and services by using a dedicated host instance that acts as a broker between clients and the application or service. It validates and sanitizes requests, and passes requests and data between them. This provides an additional layer of security, and can limit the attack surface of the system. The frontdoor role 211 performs the validation of the incoming requests and routes those requests to the management role 212, sync role 213, data access role 215 or the backup/restore role 216 based on the content of the request. The frontdoor role 211 or sync role 213 also queues requests for long running tasks to the background processing role 214 in a background task queue.

The frontdoor role 211 in some approaches also implements additional security measures or approaches to enhance the protection of the client data and the overall security of the system. The frontdoor role 211 will interact with a security library 218 to implement the additional security. The security library 218 can implement a security mechanism such as mutual authentication, SSL/TLS encryption, RMS data encryption, shared secret, distributed denial of service (DDoS) protection, and shared access signature. Other security mechanisms can be employed.

The management role 212 is in one approach configured to provide provisioning, management, and configuration capabilities to the other services and roles in the platform. The management role 212 provides service endpoints for administrative access to the core service and the ability to modify the service through command inputs. The associated data for the management role 212 is stored in the management data store 260.

The sync/recall role, referred to herein as the sync role 213, is a component of the platform that is configured to serve the synchronization and file recall foreground requests from the sync and recall clients, (e.g. client devices 290) that are provided to it from the frontdoor role 211 in a stateless manner. The client device 290 makes a sync request to the frontdoor role 211 which then provides the request to the sync role 213. The sync role 213 interfaces with a load balancer that balances the request for efficiency and to ensure that the response is returned prior to a predetermined timeout time. The sync role 213 during the sync accesses data from the metadata store 250, the file store 280, and a runtime state store 270 that are located on the background of the platform. There can be any number of sync roles 213 operating on the platform at a given time. This allows for efficient processing of sync requests. Anyone of these sync roles 213 is capable of handling the request. As such a request from a client device 290 could go to different instances of the sync role 213 at different times. As mentioned previously the sync role 213 is a stateless role with respect to the file service and file stores 280.

The core service further includes a load balancer that implements load balancing of the frontdoor requests based on a stateless sync/recall processing as well as an efficient caching system. If care is not taken over time each instance of the sync role 213 will end up caching data for every request from client devices 290 that connect or communicate with it. That is every partnership will result in additional caching. Thus, the load balancer implements a caching policy that keeps the sync role 213 from having its CPU and memory utilization from exceeding a threshold limit and also ensuring that the internal data structures stay below a threshold level. The load balancer routes, in one approach, requests using a round robin policy. That is the next sync role 213 for the service that has not had a request is assigned to process a request. The load balancer can also employ heuristics to optimize the location of the cache used locally and the resource usage. For example requests for the sync role 213 can be routed based on a hash of tenant or sync folders that provide affinity to the request without introducing statefullness to the request.

The background processing role 214 is a component of the system that handles long running tasks, as well as offloaded tasks from the sync role 213 that the sync role 213 offloads in an attempt to balance its workload. These are tasks that take a significantly long period of time and the operation of which if done in the foreground could impact the overall performance of the system. Long running tasks can include tasks such as change detection using enumeration, back-up and restore of systems, etc. The background processing role 214 receives from the frontdoor role 211 the various tasks to be performed through the background task queue. The background task queue implements sharding and priority queues for managing the tasks that are given to the background processing role 214. It uses performance metrics related to the throughput of the task. The priority queues are used primarily for requests/tasks that require low latency such as file recall. The results created by the background processing role 214 are reported to the calling client device 290 asynchronously through a notification to the device.

The data access discovery role is a component of the system that provides location and data access capability to the platform. This can include providing for secure access to the data. This secure access can be achieved using a REST interface and shared access signature keys.

The backup/restore role 216 is a component of the system that allows for the maintaining of recovery data that can recover a client device 290 in the event of a disaster, client device replacement, data loss, or other failure. Backup data can be provided from the device to the system using this role. Recovery of the client device 290 will cause the data stored in to be pushed to the client device 290 to recover the client device 290.

Monitoring service 230 is a component of the system that provides service status, and diagnostics and troubleshooting capabilities as combined view of last mile, outside in (active), and inside out (passive) monitoring of the system components. The underlying hosted platform provides monitoring of the platform infrastructure (such as a datacenter and a network), and platform services. Additional diagnostics and troubleshooting can be handled by the monitoring service 230 and are executed in the background.

Analytics service 240 is a component of the system that allows for the telemetry analysis of the system. Specifically the analytics service 240 can provide a portal through which the administrator can view business and operational analytics capabilities. This can allow the administrator to make data driven decisions about live site or business aspects of service. The analytics service 240 receives data from multiple data sources for post-processing, reporting, and machine learning. These data sources assist in generating the analysis.

Metadata store 250 is a component of system that handles the metadata for both the syncing process and files themselves. The metadata store 250 implements replica and item metadata storage, secondary indexes, locking, snapshot isolation and garbage collection. The secondary indexes support query patterns for a variety of sync scenarios, such as range queries. Locking is provided to ensure that a single writer at a time can access a particular file or a particular replica where the file resides. These accesses occur when processing change batches or during enumeration of a particular namespace 281. Snapshot isolation consumes committed data and prevents garbage collection until the various endpoints have consumed the data that has been committed. The metadata store 250 also provides cross-table consistency. Knowledge and item data must be committed together. This ensures that the full picture for a particular replica is known. That is has the replica changed or not and what the state of the replica is.

The management data store 260 is a component of the system that manages the placement of the data within the file store 280 and corresponding namespace 281, as well as any other data provided by the client device 290 for the purposes of management. As the file store 280 is shared among a variety of different users and customers each namespace 281 must be kept separate from other namespaces 281. The management data store 260 maintains a table for each namespace 281-1, 281-2, 281-N (collectively 281) that is managed by the hosting system. Each table represents the configuration for the particular tenant's replicas and the namespace 281 for each replica stored in the file store 280. This configuration ensures that the sync represents the correct configuration of the file store 280 and that the metadata also reflects this configuration.

The file store 280 is a component of the system where the actual data for the names pace 281 resides. The file store 280 can store the data in containers. Each user has a corresponding container in the file store 280 that corresponds to the sync folder maintained in the management data store 260. These user containers may be shared with a number of different users and devices as well. Access to the container may occur from multiple endpoints at the same or nearly the same time. A single container is maintained for the generic share. Again the generic share corresponds to the sync folder on the management data store 260. Unlike traditional file store 280s in a hosted environment the users and devices can write directly to the corresponding containers without having to go through the sync role 213 to perform these reads and writes. The various endpoints (users and devices) are provided with information that allows them to know the actual location on the file store 280 where the data resides, such as a uniform resource identifier (URI) or uniform naming convention (UNC). Previous approaches have required the use of the intermediary to access the file store 280 as the location of the file store 280 to the device was not known precisely. However, access to the file store 280 for a particular container or namespace 281 can still be done through the sync role 213 or other core service 210 roles as traditionally done. Thus, depending on the capabilities of the application or device the file may be accessed through either method. As such, legacy applications are able to use the file store 280 without modification. The data that is stored in the file store 280 and the particular containers is stored in a stateless manner. That is the client manages any transient state necessary for any client interactions with the file store 280. The file store 280 does not maintain any of this information with respect to this transient state of the data in its own system.

Before a file names pace 281 can be synchronized to the cloud endpoint, storage must be allocated or provisioned for the files, directories and metadata. The present approach provisions a single file share or container for each sync namespace 281. In this way multiple names paces 281 can be hosted on the cloud, but each namespace 281 is able to remain separated from one another. In one approach the file share is an Azure File Share. However, other versions and types of file shares can be used.

A file share is a unit of file storage that represents the root of a hierarchical namespace 281 of folders and files. The share can be accessed through an application programing interface (API), such as the Azure File REST API, and also through protocols, such as the CIFS/SMB protocol.

By mapping a sync names pace 281 to a file share a number of advantages can be recognized. First the file share allows for direct sync-to-share namespace 281 root mapping. Other provisioning options such as user-to-share mapping or tenant-to-share mapping require that the individual sync namespace 281 *s* are carved out underneath a file share root. Second is snapshot isolation. The present approach leverages the file share-level snapshot feature of the hosting service. This supports the ability to create and maintain an efficient copy of the state of the share at a single point in time. This is important for supporting backup-restore, migration, high-availability and other functionality where a consistent view of the namespace 281 is desired. Third is security isolation. The present approach leverages a shared access signature (SAS) authorization feature of the host service. This supports an option of controlling access to the share at the root level on a per-namespace 281 basis. Share level access control can be in place of or in addition to finer grained access control at the file or folder level.

The hosting system can implement two different approaches for determining when to provision the file share for the particular namespace 281. One approach is to use explicit provisioning through a management console to create a names pace 281 sync partnership with a specific user's names pace 281. A second approach is to implicitly provision the namespace 281 when the first attempt to sync with the names pace 281.

Once the sync namespace 281 has been provisioned with a file share the namespace 281 can be synchronized between a participant and the cloud endpoint. The sync solution uses a file synchronization protocol between two parties (end-points) of the sync partnership. The process of synchronization can follow the process discussed above with respect to FIG. 1. However, it should be noted that the protocol involves the exchange of metadata about the state of the files/folders inside the namespace 281 on each of the endpoints followed by one or more upload and download sessions where file and folder metadata and data are transferred and created on each endpoint until the state of the namespace 281 on each endpoint matches. In the case where the files have changed on both sides of the sync partnership since the last sync session, conflicts are detected which may result in one or both sets of changes being retained.

The runtime state store 270 is a component of the system that maintains the state of the files and a sync status of the files. The runtime state store 270 enables the particular sync role 213 to remain stateless with the file system and the file store 280. When the particular sync role 213 needs state to perform a particular task the runtime state store 270 provides the needed state relationship for the sync process to continue. Because the state is maintained away from the sync role 213 any sync role 213 can perform any process of the sync.

The client device 290*s* are any devices that can connect to the sync role 213 for the purposes of syncing their data with the data hosted and stored on the file store 280. The client device 290*s* can include servers located on premise, mobile phones, laptops, tablets or any other device that interfaces with the file store 280 or another instance of the core service 210. Further, devices can also be virtual versions of the devices where the device is hosted on another platform. The client device 290*s* can interact and write to the file store 280 directly or can go through the sync role 213 to access the file store 280 and the particular containers contained therein. Each client device 290 also has its own version of the sync engine 292. This sync engine is the gateway for the client device 290 to initiate a sync upload or download with the sync role 213. From the client's perspective the sync process is no different than in systems where the only way to access data is through the intermediary.

File sync activity in the present system can be periodic and driven by scheduled or can be on-demand directives from the client endpoints of the sync partnership. File access activity can occur at any time as the client device 290*s* can directly access the file store without having to use the intermediary sync role to access the cloud based files.

Figure 3:
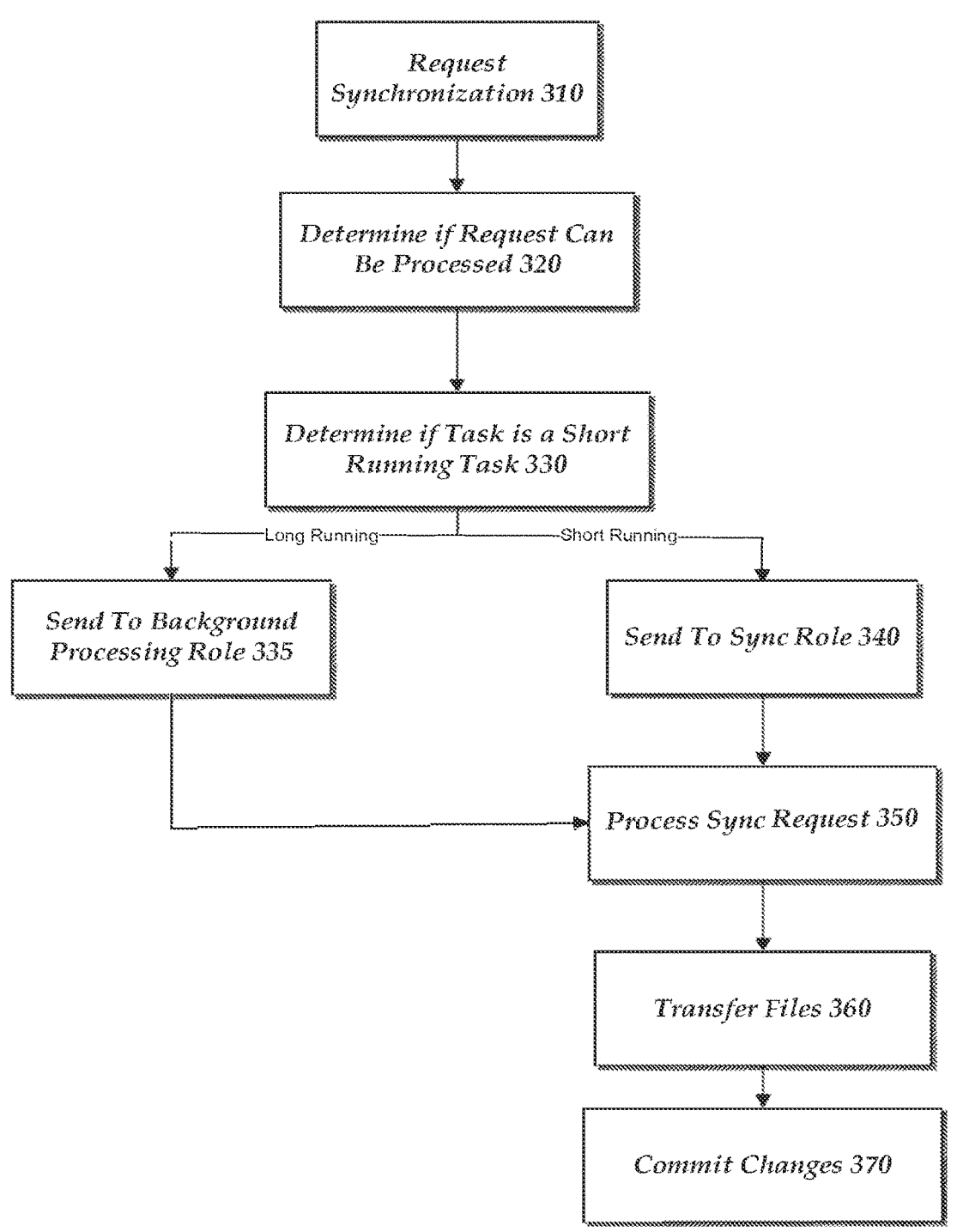
FIG. 3 is a flow diagram illustrating a process for synchronizing files a client and a hosted endpoint with a stateless sync role according to one illustrative embodiment.

FIG. 3 is a flow diagram illustrating a process for syncing files between a client device 290 and a remote file service according to one illustrative embodiment. The synchronization process begins when the client device 290 requests a synchronization session with the core service 210. This is illustrated at step 310. In some approaches the request is generated by the client device 290. In other approaches the request is generated by the core service 210. In this approach the core service 210 sends a message to the client device 290 instructing the client device 290 to make a sync request. The sync requests can be on-demand sync requests or they can be periodic sync requests. The timing of the periodic sync requests can be set by an administrator to ensure the consistency of the data across all of the sync clients. For example, a periodic sync request may be done every day or every hour depending on the level of activity in the corresponding files.

The synchronization request is received by the core service 210 and is provided to the frontdoor role 211 of the core service 210 to determine if the request can be processed. This is illustrated at step 320. Again as discussed earlier the frontdoor role 211 does not have direct access to the corresponding files in the files store, limited access to the any persistent storage of the host system and can load balance the requests that are received. At this step in the process the frontdoor role 211 implements its gatekeeper pattern in protecting the exposure of the client's data. The frontdoor role 211 verifies that the request from the client is a proper request and contains the proper credentials. If the request does not meet the requirements for access to the underlying data store or service the frontdoor role 211 does not process the requests any further. If the request does meet the requirements for access the frontdoor role 211 routes the request to the correct service role and to the shards to support the resource affinity necessary to maintain a stateless synchronization.

The frontdoor role 211 analyzes the request and determines if the particular request is for a long running task or not. This is illustrated at step 330. A long running task are tasks such as enumeration, back-up and restore of systems, etc. that user a significant amount or resources or that their execution exceeds a predetermined threshold amount of time to complete. These long running tasks are sent to the background task queue to be processed from there. The frontdoor role 211 may at this time attempt to determine the size of the request by sending the request to a sync role 213 for determination of the size of the particular request. The sync role 213 can read from the metadata store 250 to determine what files have changed. Based on the number of files that have changed the frontdoor role 211 can determine that the particular sync request is a long running request or a normal request. In some instances the frontdoor can determine on its own that the request is for a long or short running task. For example, if a sync request is for a particular file or a particular folder then the frontdoor role 211 could determine that the task is a short running task. Whereas if the request was for a series of folders or directories then frontdoor role 211 could determine that the request is a long running task. In other instances, the frontdoor role 211 simply passes the sync request to the sync role 213 and allows the sync role to determine if the requests are short running or long running, and should be processed by the sync role 213 or passed to the background task processing role 214.

The background tasks processing role receives the long running tasks from the background task queue that was populated by the frontdoor role 211. This is illustrated at step 335. The background tasks processing role takes the next task in the queue and determines if the request or tasks needs to be sharded. Sharding is a type of database partitioning that separates very large databases into smaller, faster, more easily managed parts called data shards. In this instance the file store 280 has been divided into horizontal partitions or shards. Each shard has the same schema, but holds its own distinct subset of the data. A shard is a data store in its own right, running on a different instance of the file store 280's storage nodes. In this instance the request will be split into different parts to reach the appropriate portions of the file store 280 where the underlying data is located. The background tasks processing role will then process the request to the corresponding file store 280 to retrieve or update the data that is contained. The client device 290 will be updated of the status of these background tasks asynchronously by the background tasks processing role. In one approach the background processing role 214 processes the request, and stores results in the runtime state store 270. The frontdoor 211 can retrieve the result of the operation from run time state store 270, so that the response can be provided to the client device 290. In some cases, the frontdoor 211 checks the runtime state for a small period of time, to see if the task completes in a medium (on the order of 30 seconds) amount of time, so it can return the result immediately to the client. This is useful in situations where the heuristic for identifying that a task is long running is wrong, and it actually executes quickly. In other cases, when the frontdoor 211 has waited long enough, it returns a 'pending' result back to the client, with a URL representing the pending result. The client 290 can continue waiting for the result by polling the pending result URL. The frontdoor 211, when receiving this pending result URL, can check the runtime state store 270 to see if the task has reported a result. If one is found, the result of the long-running task is returned to the client 290. The further processing of the long running task is similar to the process of a short running task and follows with steps 350-370 below.

If the request is determined to be a short running task the sync request is passed to a sync role 213 for processing. This is illustrated at step 340. The frontdoor role 211 can select the particular sync role 213 to receive the request based on a number of factors. When multiple nodes of the sync role 213 exist the frontdoor role 211 may simply choose the sync node based on a round robin approach. That is, for example, if the first sync role 213 node was selected previously the second sync node in the group of nodes would be selected for the next sync request. In other approaches the frontdoor role 211 in conjunction with the load balancer may look at the loads currently experienced on the nodes and the size of the sync requests and select a low usage sync role 213 node for the processing of the request. The frontdoor role 211 load balances the request and then sends the request to the selected sync role 213. In some approaches due to the size of the sync request or the speed needed for request to be serviced in the sync request may be broken apart or sharded into several batches by the frontdoor role 211. Each of these batches may be sent to a different sync role 213 for processing. In some approaches a request may be sent to the background processing role 214 instead.

The sync role 213 receives the request for the synchronization from the frontdoor role 211 and begins to process the synchronization request. This is illustrated at step 350. At this point the sync role 213 needs to determine what files have changed and therefore which files will require synchronization with. The sync role 213 builds or identifies a batch of files to be uploaded or downloaded from the file store 280 based on the changes. This information as to which files are to be modified by the sync process is provided back to the frontdoor role 211 which provides this information to the client device 290. In some approaches the sync role 213 can provide this information directly back to the client device 290. Included with the files that are to be modified either by upload or download the sync role 213 may provide the universal resource identifier such that the client device 290 can read to or write directly to the file store 280 as part of the sync process. In this way any sync role 213 can handle the requests for the sync process as it does not need to maintain state with the files during the process. For upload sync the sync role 213 causes a staging folder or area to be created in the file store 280. The staging folder is a holding area where the newer versions of the files to be synced are temporarily held until the sync role 213 can commit the files to the file store 280 through the syncing process. In some approaches the sync role 213 can determine that the particular request that was sent to it will exceed a predetermined threshold of resource usage. In this approach the sync role 213 can redirect the request to the background processing role 214 for processing. In other approaches the sync role 213 can shard the request itself and send to other sync roles.

The client device 290 receives the batch information of what files to upload or download to or from the file store 280 and transfers the files indicated in the batch. This is illustrated at step 360. At this step, and depending on the upload or download sync the file system for the client device 290 either uploads the files to the staging folder in the file store 280 or downloads the corresponding files from the file store 280. This upload/download of the files is performed directly with the file store 280 or through the user of a different file transfer protocol, and not through the core service 210 or the sync role 213. In this way the particular roles in the core service 210 are not required to maintain state with the files themselves during this process. State is maintained only with the file store 280. When files are uploaded to the file store 280 they are uploaded to a staging folder in the file store 280. Each batch that was created by the sync role 213 may have its own staging area. Once the files are uploaded to the staging area, or the download is completed the client device 290 sends a message to the sync role 213 that indicates that the upload/download has been completed by the client device 290. In some approaches the files in the staging folder and the corresponding version of the files in the file store 280 are not locked from reading and writing during the upload process. If the files in the file store 280 change before the sync can be done, such as from another device accessing the file store 280 though the direct access feature that file will not be synced or committed at this time, but may be held back until a later sync.

The sync role 213 responds to the indication that the upload/download has been completed by committing the changes. This is illustrated at step 370. For a download the sync role 213 provides change batches to the client allowing the client to download the files content and apply the changes to its local file store and local metadata store. In some approaches the sync role 213 commits the changes by updating the sync request to completed and in some approaches updating the metadata store 250 to indicate that a particular client has been updated with this information. With an upload the sync role 213 causes the files in the staging area to overwrite or replace the corresponding file in the file store 280 as well as updating the metadata store 250. The sync role 213 causes the file in the file store 280 to be renamed to temporary file and then the file in the staging area is renamed to the file store 280 as the new version of the file. This allows for the files to be updated and the batch to be processed even if the particular servicing sync node were to experience failure during the sync process, as any sync node can pick up the files from the staging folder and continue the synchronization process.

Figure 4:
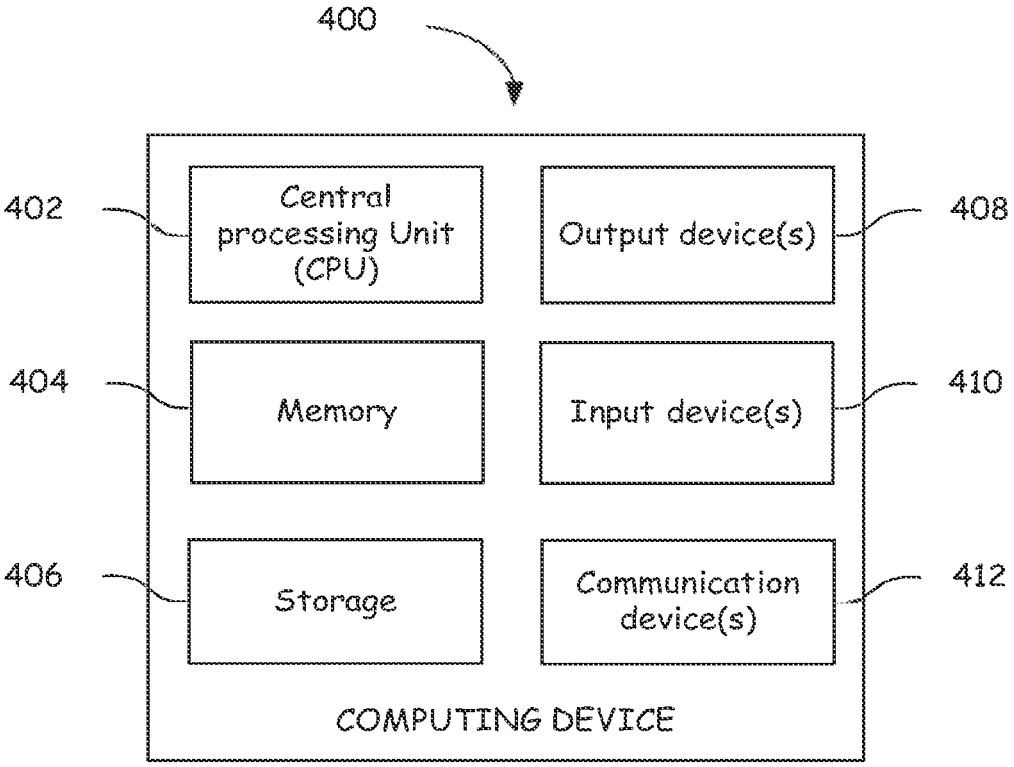
FIG. 4 illustrates a component diagram of a computing device according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by the system of the present embodiments. Further, computing device 400 can be a distributed computing device where components of computing device 400 are located on different computing devices that are connected to each other through network or other forms of connections. Additionally, computing device 400 can be a cloud based computing device.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 6 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method comprising:
   storing, at a host service, a synchronization state of a sync node synchronizing data between a client device and a remote data store;
   receiving, by the host service from a client device, a sync request to resume synchronizing the data between the client device and the remote data store, wherein the sync request comprises a plurality of data sync tasks for synchronizing the data between the client device and the remote data store;
   transmitting the synchronization state to a stateless sync node that is stateless in synchronizing the data between the client device and the remote data store, thereby resuming synchronizing, via the stateless sync node, the data based on the synchronization state, wherein the resumed synchronizing results in changes to the data stored in at least one of the client device or the remote data store by assigning a data sync task of the plurality of data sync tasks to the stateless sync node; and
   committing, by the host service, the changes.

2. The method of claim 1, wherein the synchronization state comprises a synchronization history of the data between the client device and the remote file store performed by at least one different stateless sync node.

3. The method of claim 1, further comprising selecting the stateless sync node from among a plurality of stateless sync nodes based on a current sync load among the plurality of stateless sync nodes.

4. The method of claim 1, further comprising selecting the stateless sync node from among a plurality of stateless sync nodes based on an expected duration of a sync task identified by the sync request.

5. The method of claim 1, further comprising selecting the stateless sync node from among a plurality of stateless sync nodes based on a round-robin approach.

6. The method of claim 5, wherein the selecting comprises selecting a different stateless sync node than a most recently selected stateless sync node from among the plurality of stateless sync nodes.

7. The method of claim 1, further comprising dividing a sync task associated with the sync request into a plurality of shards, and distributing the plurality of shards to a plurality of stateless sync nodes, respectively.

8. The method of claim 1, wherein the synchronizing is resumed based on a point at which a different stateless sync node finished synchronizing the data between the client device and the remote file store.

9. A computing system comprising:

at least one processor; and a memory storing instructions that, when executed by the at least one processor, cause the computing system to perform a set of operations, the set of operations comprising:

storing, at a host service, a synchronization state of a sync node synchronizing data between a client device and a remote data store;

receiving, by the host service from a client device, a sync request to resume synchronizing the data between the client device and the remote data store, wherein the sync request comprises a plurality of data sync tasks for synchronizing the data between the client device and the remote data store;

transmitting the synchronization state to a stateless sync node that is stateless synchronizing the data between the client device and the remote data store, thereby resuming synchronizing, via the stateless sync node, the data based on the synchronization states, wherein the resumed synchronizing results in changes to the data stored in at least one of the client device or the remote data store by assigning a data sync task of the plurality of data sync tasks to the stateless sync node; and committing the changes.

10. The computing system of claim 9, wherein the synchronization state comprises a synchronization history of the data between the client device and the remote file store performed by at least one different stateless sync node.

11. The computing system of claim 9, wherein the set of operations further comprises selecting the stateless sync node from among a plurality of stateless sync nodes based on a current sync load among the plurality of stateless sync nodes.

12. The computing system of claim 9, wherein the set of operations further comprises selecting the stateless sync node from among a plurality of stateless sync nodes based on an expected duration of a sync task identified by the sync request.

13. The computing system of claim 9, wherein the set of operations further comprises selecting the stateless sync node from among a plurality of stateless sync nodes based on a round-robin approach.

14. The computing system of claim 13, wherein a different stateless sync node is selected than a most recently selected stateless sync node from among the plurality of stateless sync nodes.

15. The computing system of claim 9, wherein the set of operations further comprises dividing a sync task associated with the sync request into a plurality of shards and distributing the plurality of shards to a plurality of stateless sync nodes, respectively.

16. The computing system of claim 9, wherein synchronizing is resumed based on a point at which a different stateless sync node finished synchronizing the data between the client device and the remote file store.

17. A non-transitory computer-readable medium comprising instructions which when executed by a processor cause a computer to perform a method comprising:

storing, at a host service, a synchronization state of a sync node synchronizing data between a client device and a remote data store;

receiving, by the host service from a client device, a sync request to resume synchronizing the data between the client device and the remote data store, wherein the sync request comprises a plurality of data sync tasks for synchronizing the data between the client device and the remote data store;

transmitting the synchronization state to a stateless sync node that is stateless in synchronizing the data between the client device and the remote data store, thereby resuming synchronizing, via the stateless sync node, the data based on the synchronization state, wherein the resumed synchronizing results in changes to the data stored in at least one of the client device or the remote data store by assigning a data sync task of the plurality of data sync tasks to the stateless sync node; and committing, by the host service, the changes to the data.

18. The non-transitory computer-readable medium of claim 17, wherein the method further comprises selecting the stateless sync node from among a plurality of stateless sync nodes based on a current sync load among the plurality of stateless sync nodes.

19. The non-transitory computer-readable medium of claim 17, wherein the method further comprises selecting the stateless sync node from among a plurality of stateless sync nodes based on an expected duration of a sync task identified by the sync request.

20. The non-transitory computer-readable medium of claim 17, wherein the method further comprises selecting the stateless sync node from among a plurality of stateless sync nodes based on a round-robin approach in which a different stateless sync node than a most recently selected stateless sync node is selected from among the plurality of stateless sync nodes.

* * * * *